(12) United States Patent
Mokris et al.

(10) Patent No.: US 6,540,607 B2
(45) Date of Patent: Apr. 1, 2003

(54) VIDEO GAME POSITION AND ORIENTATION DETECTION SYSTEM

(75) Inventors: Peter W. Mokris, Fremont, CA (US); Michael E. Albaugh, Saratoga, CA (US); Minh Nguyen, San Jose, CA (US)

(73) Assignee: Midway Games West, Milpitas, CA (US)

( * ) Notice: Subject to any disclaimer, the term of this patent is extended or adjusted under 35 U.S.C. 154(b) by 84 days.

(21) Appl. No.: 09/842,443

(22) Filed: Apr. 26, 2001

(65) Prior Publication Data

US 2002/0160840 A1 Oct. 31, 2002

(51) Int. Cl.⁷ .......................... A63F 13/04; G01B 11/26
(52) U.S. Cl. .......................... 463/5; 463/51; 250/206.2; 345/158; 356/139.03
(58) Field of Search .............................. 463/5, 51, 52; 250/206.1, 206.2; 356/139.03; 345/158

(56) References Cited

U.S. PATENT DOCUMENTS

| | | | | |
|---|---|---|---|---|
| 5,059,789 A | * | 10/1991 | Salcudean | 250/206.1 |
| 5,239,464 A | * | 8/1993 | Blair et al. | 463/5 |
| 5,469,193 A | | 11/1995 | Giobbi et al. | 345/158 |
| 5,748,505 A | * | 5/1998 | Greer | 356/139.03 |
| 5,767,524 A | * | 6/1998 | Barbier et al. | 250/206.2 |
| 5,926,168 A | * | 7/1999 | Fan | 345/158 |
| 6,146,278 A | * | 11/2000 | Kobayashi | 463/51 |

* cited by examiner

Primary Examiner—Andrew M. Dolinar
(74) Attorney, Agent, or Firm—Knobbe, Martens, Olson & Bear LLP

(57) ABSTRACT

A position sensing apparatus and method includes a targeting device with a plurality of infrared transmitters or photodiode receivers attached to the targeting device and with corresponding receivers or transmitters mounted near a display monitor. The transmitters emit light signals that are received by the photodiode receivers. Receiver circuitry converts the light signals into signals representing the distance of the transmitters from the receivers. A processor then calculates the three-dimensional position and vector of the targeting device relative to the display monitor.

10 Claims, 4 Drawing Sheets

VIDEO GAME POSITION AND ORIENTATION DETECTION SYSTEM

BACKGROUND OF THE INVENTION

1. Field of the Invention

The invention relates to position sensors and more specifically to an apparatus for detecting the position coordinates and orientation of a targeting device.

2. Description of the Related Art

Conventional optical coordinate detection in most video game systems makes use of the vertical and horizontal synchronizing signals in the video signal generated by a game device. In order to define the location of an object on a video screen, the game device is provided with a horizontal counter for counting the columns on a display screen, a vertical counter for counting the number of scanning lines, and a real, user manipulated device, such as a model gun, sword, paint brush, boxing glove, shield, etc. for interacting with images on the display screen. The device is provided with a photosensor which receives light from the scanning lines shown on the display screen, and which has a certain degree of directionality. In other words, the device does not emit a light ray, but rather it actually receives a portion of the light emitted from the display.

Presently known shooting game machines may include an object such as a gun, and function such that the display screen turns white for one frame when the game controller detects that the player has pulled a trigger on the model gun. Starting at the next vertical blanking period following the "shot", white pixels are displayed and counted starting from the upper left along a scan line. As each scan line is filled and counted, the system looks for where the shot from the gun would have impacted the screen by continuously looking for an illumination detection by a photosensor in the gun, and thus the targeted position is detected based on the pixel and scan line count at which the photosensor receives light from the raster scanning screen.

Unfortunately, the display screen turns white every time the trigger of the model gun is pulled. This may be used as a benefit in simulating a gun flash and giving the player instant feedback, but the intensity of the light from the white screen can be also annoying to the player. Further, when using a rapid-fire gun, the display screen is constantly flickering and reduces the quality of the display screen image. Also, this places an extra stress on the power supply of the monitor. Putting up a screen of white is a big jolt to the power supply and has been known to cause power supply failure.

Additionally, because NTSC is displayed at 59.9 Hz (60 Hz.), the fastest one can update the pointer value is 60 Hz/2. This allows for one screen frame of video to be interlaced between one white position finding frame. Actual games include more frames of video between successive white frames, since the image quality is unsatisfactory with so many white screens. However, there are many times when it would be desirable to have a faster update, such as when tracking rapid movements or simulating rapid gun-fire, such as with a machine gun.

Furthermore, with the advent of digital displays, the conventional method does not work in a straightforward manner because digital displays do not normally display the scanning lines. Additionally, the conventional method only determines the location on the display screen to which the model gun is pointing. The position coordinates of the model gun and the vector in which the model gun is pointed are not determined. Accordingly, input into the shooting game cannot generate scenes from the user's perspective and generate simulated bullet traces because the position of the gun is not known. Also, known shooting games cannot take advantage of the increased computer processing speeds and more realistic digital displays. In view of the above, it would be a significant improvement in the technology to provide a targeting system that does not depend on a raster scanning display screen and also one that can detect and input the position of the targeting device and the direction it is pointing into the video game system.

SUMMARY OF THE INVENTION

In accordance with the invention, there is disclosed an apparatus and a method for determining a targeting device's position coordinates and orientation in such a way as to be unrelated to the video being displayed.

In one embodiment, a position sensing apparatus includes a targeting device, a plurality of transmitters for transmitting light signals, a plurality of receivers capable of detecting the light signals from the transmitters, and a receiver circuit connected to the receivers. The receiver circuit develops distance signals representative of the distance of the transmitters from the receivers and sends the signals to a processor to determine the three-dimensional coordinate position and orientation of the targeting device with respect to a display monitor.

Another embodiment is a targeting game machine including a display monitor for displaying a target and at least one targeting device. The game machine includes at least three transmitters for emitting infrared light signals, wherein at least three transmitters are mounted on the at least one targeting device, and at least three photodiode receivers capable of detecting the light signals from said transmitters, wherein the receivers are mounted about the display monitor. The game machine also includes a receiver circuit electrically connected to said receivers, wherein the receiver circuit generates signals in relation to the intensity of the infrared light signals detected by the receivers, the generated signals representing the distance of the transmitters from the receivers, and a processor for processing the signals to determine the three-dimensional coordinate position and orientation of the targeting device with respect to the display monitor.

Another embodiment is a method of detecting a targeted position of a targeting device relative to a display monitor for use in a targeting game machine. The targeting device and the display monitor have a plurality of transmitters and a plurality of receivers fixedly mounted thereto. The method includes emitting light signals from the transmitters, detecting light signals emitted from the transmitters at the receivers, and calculating the three-dimensional position and orientation of the targeting device.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

DETAILED DESCRIPTION OF THE PREFERRED EMBODIMENT

The following presents a detailed description of certain specific embodiments of the present invention. However, the invention can be embodied in a multitude of different ways as defined and covered by the claims. The invention is best understood by reference to the figures wherein like parts are designated with like numerals throughout.

Figure 1:
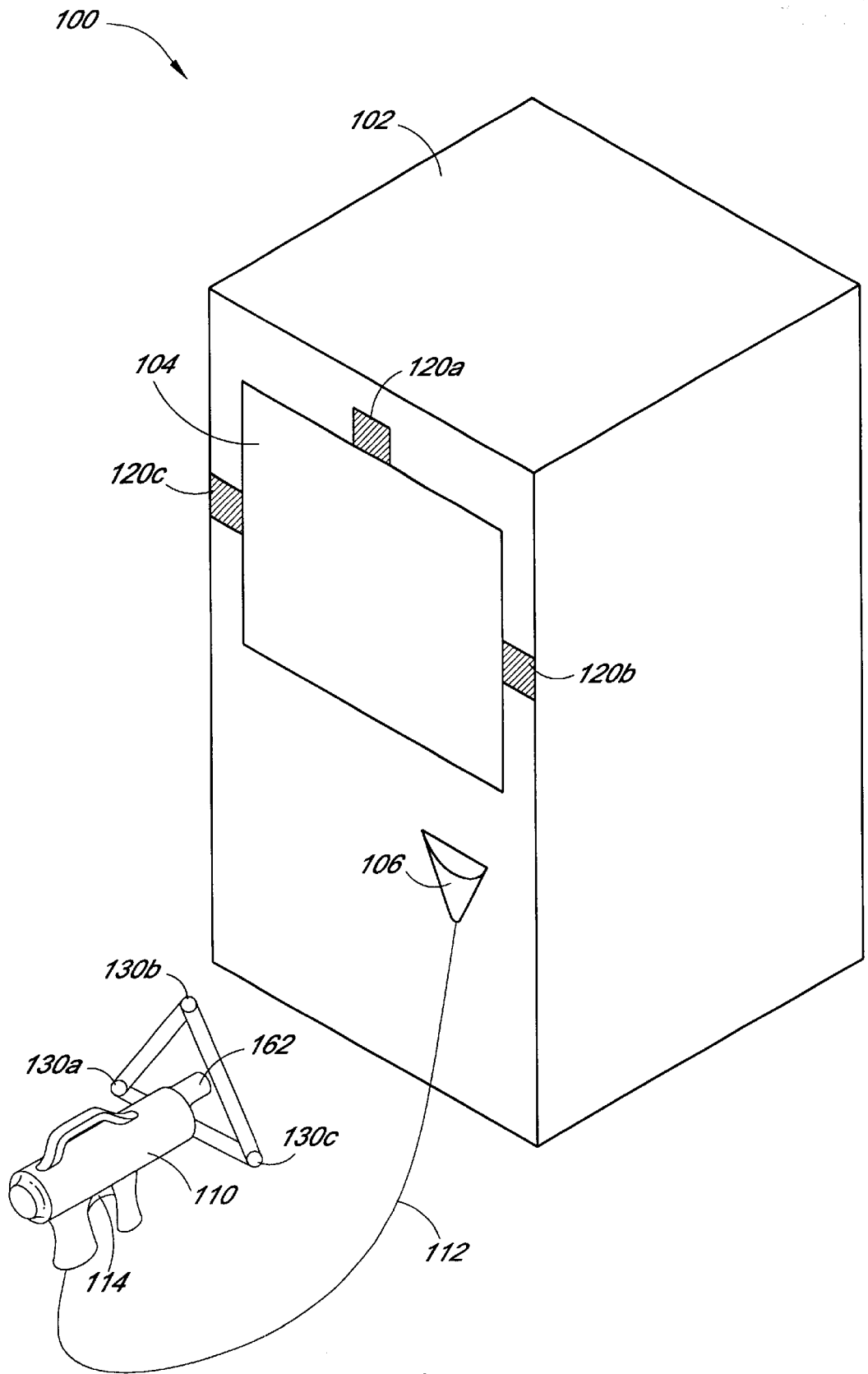
FIG. 1 is a perspective view of a shooting video game machine that includes an embodiment of the position sensor system of the invention.

FIG. 1 illustrates a perspective view of a video game machine 100 that includes an embodiment of a position sensor system of the invention. Although the embodiment of the position sensor system described in the following figures and description is presented as a shooting video game, one skilled in the art will recognize that the position sensor system can be used in any application where the position and orientation of an article visible to a control unit is desired.

The shooting game machine 100 comprises a housing 102 within which a video display monitor 104 is located facing toward a player (not shown). The video display monitor 104 may be a raster scan or digital display monitor. The housing 102 includes a holder 106 in which a targeting device such as a model gun 110 is received. The model gun 110 is connected to an internal circuit in the housing 102 through a cable 112. Alternatively, the model gun 110 can be cordless.

When the player stands in front of the display with the gun 110, a game scene is displayed on the video display monitor 104. The player can aim the gun 110 at targets successively displayed on the video display monitor 104 and pull a trigger 114 on the gun 110 to simulate shooting the targets. The appearance of the shooting game machine of FIG. 1 is basically similar to that of the conventional shooting game machines except that the housing 102 has three infrared photo receivers 120A–C positioned at spaced locations on the housing 102 and adjacent the edge of the monitor 104. The gun 110 has three infrared LED transmitters 130A–C positioned on the gun 110 as will be explained below.

In one embodiment, the housing 102 can have three infrared photo receivers 120A–C positioned about the periphery of the monitor 104. The receivers 120A–C can be positioned in a right triangle formation about the monitor 104 so that the base line between receivers 120A and 120C forms one leg of the right triangle and the base line between receivers 120A and 120B forms the second leg of the right triangle. In one embodiment, the receivers are positioned in the housing 102 so that the base line between receivers 120A and 120C and the base line between receivers 120A and 120B are 32 inches in length. This distance becomes a calibration distance as discussed below. Alternatively, other receiver orientations and distances between the receivers may be used.

An embodiment of the gun 110 is illustrated as including three infrared led transmitters 130A–C positioned on the gun 110. Although the depicted embodiment describes the transmitters 103A–C mounted on the gun and the receivers 120A–C mounted on the housing 102, it is also understood that embodiments of the invention can have the transmitters mounted on the housing and the receivers mounted on the gun. The transmitters 130A–C can be positioned on the gun 110 so that they are located at the corners of an equilateral triangle. In one embodiment, the transmitters 130A–C are positioned so that each side of the equilateral triangle formed by the three transmitters 130A–C is six inches in length. Alternatively, distances greater than or less than six inches and orientations other than an equilateral triangle can be used. The transmitters 130A–C can be commercially available transmitters such as a model PDI-E804 from Photonic Detectors, Inc., which have the desirable optical qualities of broadcasting light over a wide and even pattern.

The transmitters 130A–C are positioned on the gun 110 and the gun 110 is located for use in such a manner that there is no obstruction between the transmitters 130A–C and the receivers 120A–C. The transmitters 130A–C can be positioned on the gun 110 so that each is recessed in a respective beveled hole in the body of the gun (not shown). The beveled holes can be of sufficient depth so as to prevent contact by the player with the transmitters 130A–C. However, the transmitters 130A–C should be close enough to the surface of the beveled holes on the gun 110 so that the light from the transmitters 130A–C does not reflect off the interior surfaces of the holes.

The transmitters 130A–C emit a modulated, infrared light signal over a tightly controlled bandwidth. In one embodiment, the transmitters 130A–C emit a square wave with a 50% duty cycle at about 31k Hz. As explained below, the transmitters 130A–C receive a control signal dictating when to transmit. In one embodiment, each transmitter 130A–C is time sequenced to transmit for $\frac{1}{6}^{th}$ of the total transmit time. In one embodiment, the shooting game machine 100 can include two guns 110A and 110B, each gun 110A, 110B having three transmitters 130A–C. Therefore, in this embodiment, there are six transmitters 130, making it desirable that each transmitter 130 be active for $\frac{1}{6}^{th}$ of the total transmit time. This allows the transmitters 130A–C on gun 110A and the transmitters 130A–C on gun 110B to be sequenced so that the three receivers 120A–C will receive a signal from only a single transmitter 130 at any given time. Alternatively, one skilled in the art will recognize that code division multiplexing can be used enabling two transmitters to emit signals at the same time, with their modulation in quadrature.

Figure 2:
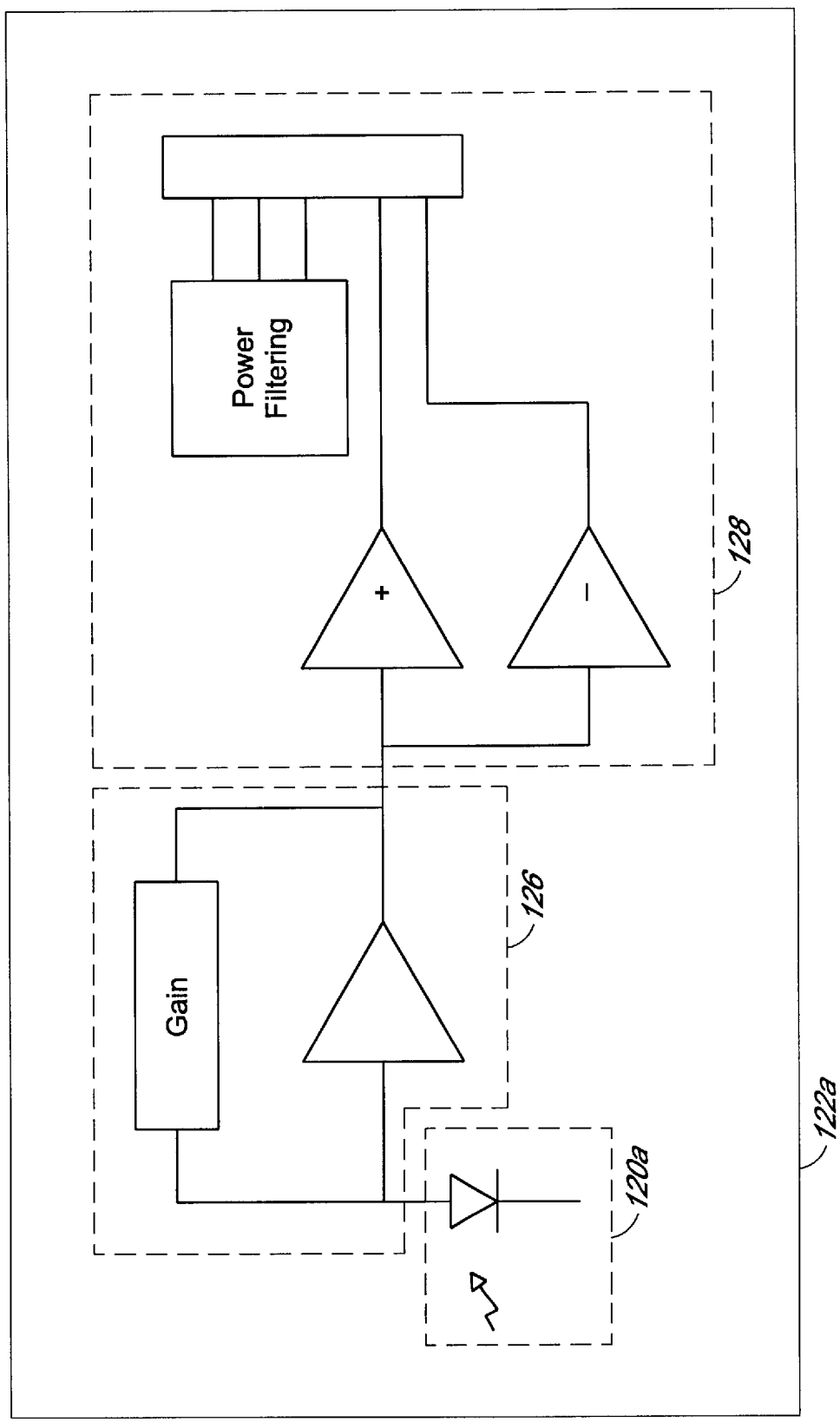
FIG. 2 is a block diagram of the IReye board.

FIG. 2 is a block diagram showing receiver 120A mounted on an IReye board 122A. Receivers 120B–C (not shown) are similarly mounted on identical IReye boards 122B–C, respectively. The receivers 120A–C are photo diode receivers such as model LTR-516AD available from LITE-ON, Inc. The receivers 120A–C are receptive to an AC signal at a wide range of frequencies. The receivers 120A–C convert the amount of light received at all amplitudes within the bandwidth of the circuit into an analog signal proportional to the amount of light received. Each of the IReye boards 122A–C amplifies the signal using a low noise op-amp 126 and then a differential driver op-amp 128 and then outputs the signal. The IReye boards 122A–C gather light energy, for example, square-wave modulated light. Alternatively, other forms of modulation, such as sine-wave modulation or triangle-wave modulation can be used. It is preferable that the IReye boards 122A–C do not gather DC light sources such as sunlight or flash light.

Figure 3:
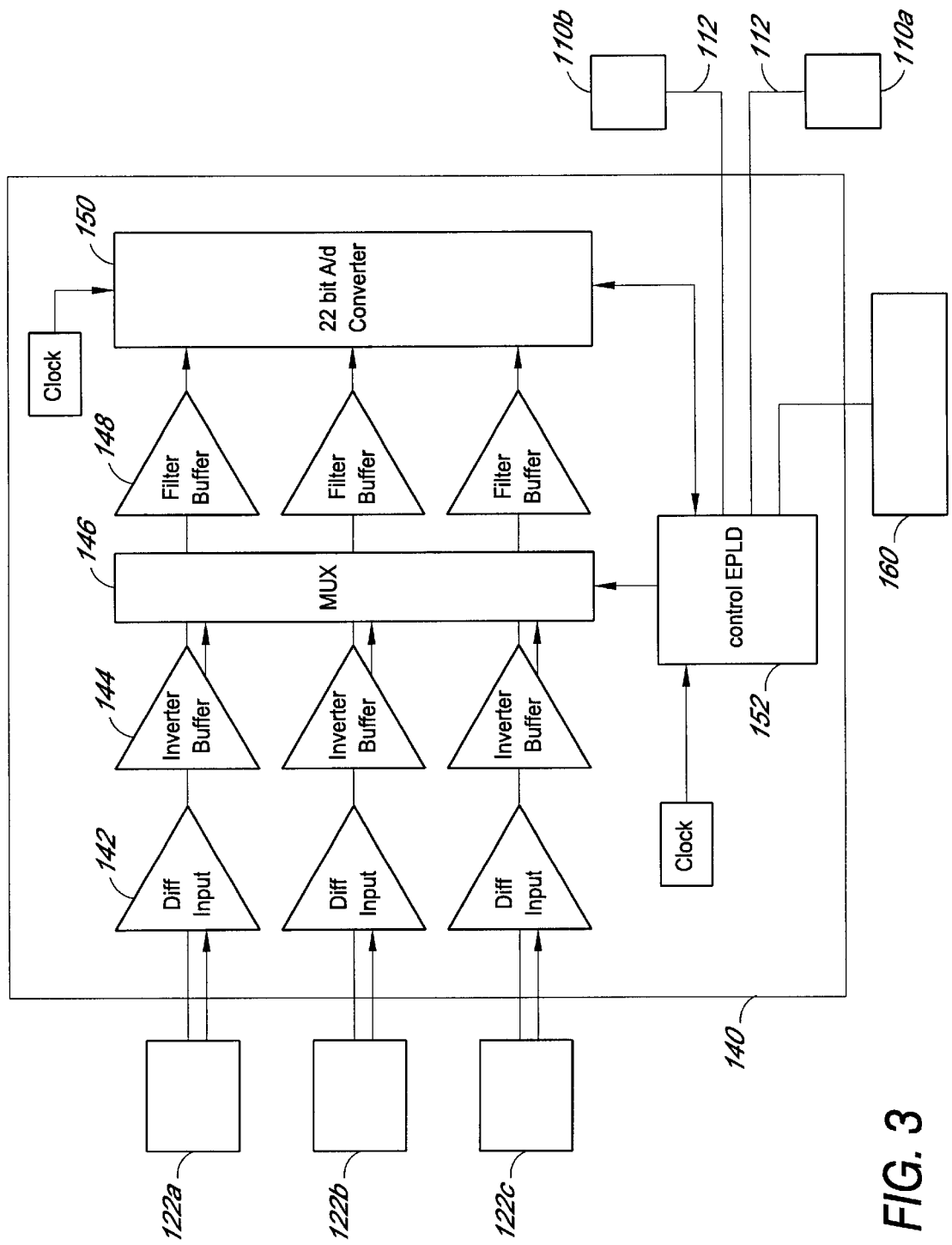
FIG. 3 is a block diagram of the Eyecon board.

FIG. 3 is a block diagram illustrating an Eyecon board 140 located in the housing 102 (FIG. 1) and shows that the analog signal from each IReye board 122A–C is received by a differential input amplifier 142 on the Eyecon board 140. The signals are then sent to an inverter buffer 144. The signals are then sent to a multiplexer (MUX) 146 that switches at the transmission frequency. This method of signal reconstruction is known as a synchronous detector (code-division-multiplexing) and is known in the art. The resulting polarized analog signal is sent from the MUX 146 to a low pass filter buffer 148. The signal is then sent to an analog-to-digital converter (A/D) 150. In this system, the signal, plus its inversion, when read synchronously will add up to the original signal, minus interference noise. A serial control connects the A/D converter 150 to a control EPLD 152 which provides a convenient parallel connection to a game-control processor (not shown), as well as providing timing signals to the gun 110, receivers, 120A–C and other auxiliary input/output devices such as flashing lights (not shown).

The control EPLD 152 is also electrically connected to the gun 110 through the cable 112. The control EPLD 152 controls the timing cycle of the transmitters 130A–C on the gun 110 so that only one transmitter is active at a time. A processor 160 located in the housing 102 is connected to the control EPLD 152. The ELPD synchronizes the signals with the corresponding transmitter and sends the data to the processor 160. The processor 160 converts the signals into position data for each of the transmitters 130A–C.

As discussed above, in one embodiment the receivers 120A–C are positioned around the display monitor 104 to define a right triangle configuration. Referring back to FIG. 1, in one embodiment, the base line distance between the receivers 120A and 120B and between receivers 120A and 120 C is 32 inches. This distance of 32 inches is defined as D or one light scale unit (LSU). Of course, it is conceived that other distances can be selected for this reference unit.

The three transmitters 130A–C are calibrated by noting the light amplitude for each transmitter 130A–C while placed directly over each receiver 120A–C at a distance of one LSU. Noting that the intensity of light varies as the inverse square of the distance the light travels (assuming a spreading light source), the distance can be calculated by dividing a proportionality constant by the square root of the light reading. The distance then defines a sphere centered on the respective receiver with the radius of the sphere equal to the distance of the transmitter 130 from the receiver 120.

The distances calculated from the light readings then can be used to calculate position of the transmitters 130A–C as now discussed. The distance a first transmitter, for example 130A, is from receiver 120A defines a first sphere centered on the receiver. Likewise, the distance from receiver 120B defines a second sphere and the distance from 120C defines a third sphere. The intersection of the first two spheres defines a circle. Then, the intersection of the third sphere and the above-defined circle defines two points. One of the points will be located behind the housing 102 and can be eliminated.

The distances to the other two transmitters 130B and 130C are similarly determined. This allows the calculation of the positions of the points of the three transmitters 130A–C in three dimensional space, thereby defining a plane on which the transmitters 130A–C are located.

Referring back to FIG. 1, the geometry of the transmitters 130A–C positioned on the gun 110 is illustrated. The three-space coordinates of the transmitters determined above now define a triangle in space. A "weighted average" of those coordinates can be used as the (x,y,z) of the tip of the gun-muzzle 162. In one embodiment where the transmitters 130A–C are positioned in an equilateral triangle as described above, the weights of the coordinates are the same, simplifying the calculation.

The midpoint of the plane and the perpendicular vector pointing in the direction of the three receivers 120A–C can now be calculated. The cross-product of two of the vectors defined between the transmitters 130A–C will give the normal vector to the plane defined by the three transmitters. For example, the cross-product of the vector from transmitter 130A to transmitter 130B and the vector from transmitter 130B to transmitter 130C defines a vector normal to the plane containing the three transmitters. Using the position and orientation of the triangle of transmitters, the position and orientation of the gun 110 is calculated. For example, the muzzle of the gun 110 would be within the triangle, and the barrel of the gun is parallel to the normal vector calculated above.

The receivers 120A–C are located around the monitor 104 in a right triangle configuration to promote the least obstructed pathway between transmitters 130A–C and receivers 120A–C (taking into account players of various sizes and/or pedestals that may be added to the configuration of the housing 102). Since the output from this system will be mapped onto a rectangular monitor 104 with coordinates that align with horizontal and vertical, the data must be rotated 45 degrees counter clockwise from the XYZ coordinate system of transmitter 120A to that of the monitor 104. This is easily accomplished by rotating the data around a known point, such as the center of the monitor 104. This point, though virtual, is well defined and scales with both the size of the monitor 104 and the length of the legs of the right triangle formed by the receivers 120A–C.

Figure 4:
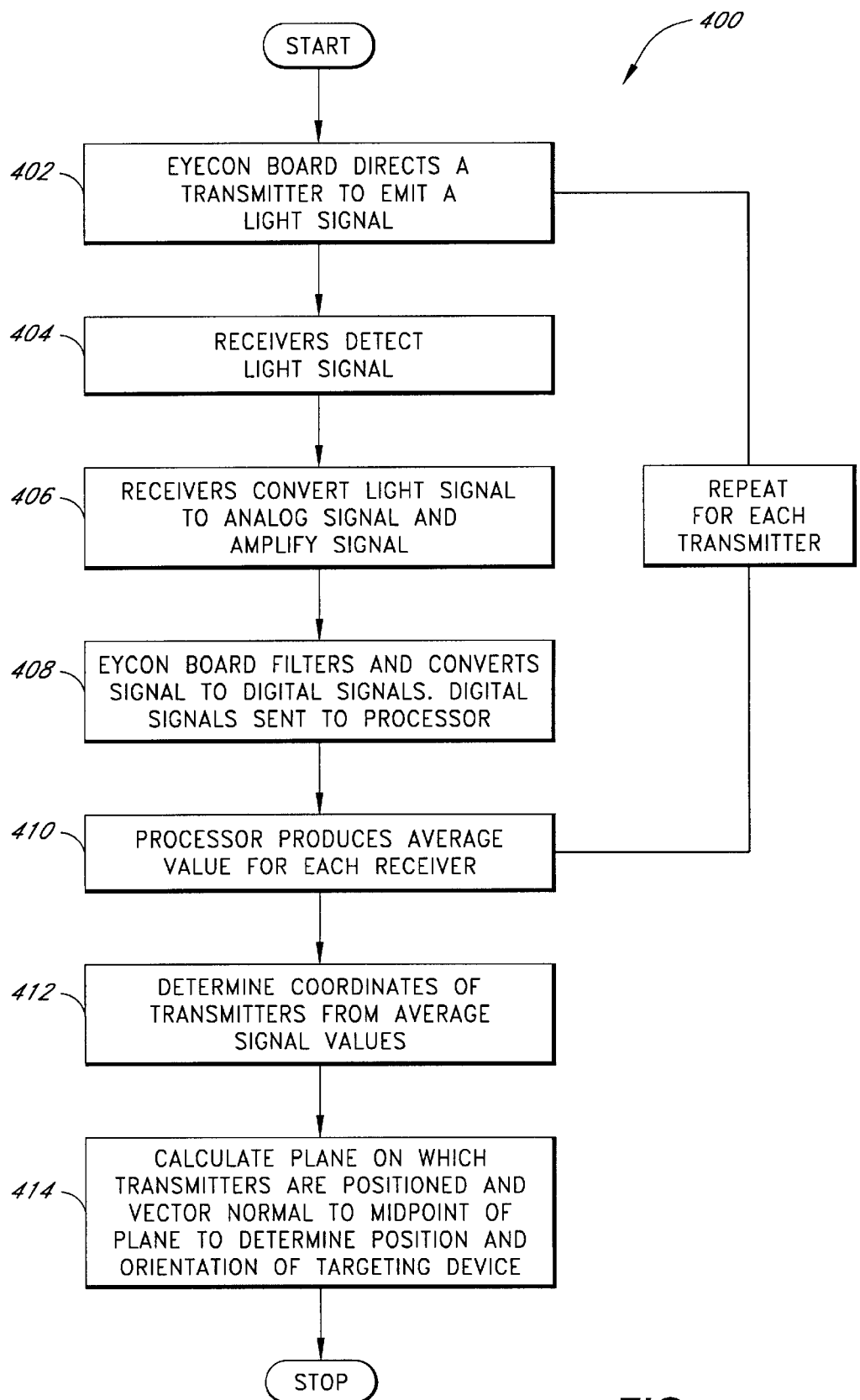
FIG. 4 is a flow chart of a method of operating the position sensing system.

A method 400 of operating of the position sensor system will now be described with reference to FIG. 4. In step 402, a signal is generated by the Eyecon board 140 directing the first transmitter 130 to emit a light signal. The system then moves to a step 404, wherein the light signal is received by the receivers 120A–C. The system then moves to a step 406, wherein the light received from the transmitter 130 is converted into an analog signal, which is amplified and sent to the Eyecon board 140. Next, in step 408, the Eyecon board 140 uses code-division multiplexing to remove noise and then converts the analog signals into digital signals as explained above. In one embodiment, the transmission time period for any one transmitter is enough to allow more than one conversion of the analog signal by the A/D converter 150 on the Eyecon board 140. For example, the time period can be such that six signals are generated for each transmitter. Multiplying these six signals by three receivers 120A–C, it can be seen that a total of eighteen sets of raw data are passed to the processor 160 during this step.

The system then moves to a step 410, wherein the processor 160 takes the six sets of data from each of the three receivers 120A–C, sums and averages the data, and produces three averaged values, (one for each receiver from the one transmitter of that time period), which are stored by the processor 160. The sequence then proceeds to the next transmitter 130. In an embodiment with one gun 110, this sequence continues until each of the three transmitters 130A–C have been activated for their period of time, producing nine averaged values. In the embodiment having two guns 110A and 110B, this sequence would proceed through all six transmitters 130 to produce a total of eighteen averaged values. The process then starts over again with the first transmitter 130. In one preferred embodiment, one cycle through all six transmitters 130 can be completed in less than 1/60 of a second.

In step 412, the processor 160 uses the eighteen sets of averaged data to determine the XYZ coordinates of the six transmitters 130. In step 414, the plane of the three transmitters 130A–C on each gun 110A and 110B is calculated and the vector normal to the plane through the midpoint is calculated. These values are then sent to the video game software to be used by the processor 160 in the generation of the three-dimensional scenes displayed on the display monitor 104.

The three-dimensional coordinates and the orientation of the gun 110 as calculated are input to the processor 160 and used to generate three-dimensional scenes displayed on the display monitor 104. The position and vector can be used to project a virtual vector into the scene of the game depicting the targeted position of the gun 110 or to display the trajectory of gunfire or laser shots from the gun 110 into the displayed scene.

Specific blocks, sections, devices, functions and modules have been set forth. However, a skilled technologist will realize that there are many ways to partition the system of the present invention, and that there are many parts, components, modules or functions that may be substituted for those listed above. Although the above detailed description has shown, described and pointed out fundamental novel features of the invention as applied to various embodiments, it will be understood that various omissions and substitutions and changes in the form and details of the device illustrated may be made by those skilled in the art, without departing from the spirit of the invention.

What is claimed is:

1. A targeting game machine comprising:
    a display monitor for displaying a target;
    at least one targeting device;
    at least three transmitters for emitting infrared light signals, wherein at least three transmitters are mounted on the at least one targeting device;
    at least three photodiode receivers capable of detecting the light signals from said transmitters, wherein the receivers are mounted about the display monitor;
    a receiver circuit electrically connected to said receivers, wherein the receiver circuit generates signals in relation to the intensity of the infrared light signals detected by the receivers, the generated signals representing the distance of the transmitters from the receivers; and
    a processor for processing the signals to determine the three-dimensional coordinate position and orientation of the targeting device with respect to the display monitor.

2. The targeting game machine of claim 1 wherein the transmitters are time sequenced so that only one of the plurality of transmitters emits a signal at a time.

3. The targeting game machine of claim 1, comprising two targeting devices.

4. The targeting game machine of claim 3 wherein three transmitters are connected to each of the targeting devices.

5. The targeting game machine of claim 1 wherein the transmitters are positioned on the targeting device at the corners of a triangle formation.

6. The targeting game machine of claim 1 wherein the transmitters emit a square-wave modulated light signal.

7. The targeting game machine of claim 1 wherein the receivers are positioned about the monitor at the corners of a right triangle formation.

8. The targeting game machine of claim 1, wherein the processor determines a plane defined by the position of the transmitters mounted on the targeting device and the perpendicular vector pointing in the direction of the receivers.

9. A method of displaying the targeted location of a targeting device relative to a display monitor for use in a targeting game machine, said targeting device having a plurality of transmitters connected to said targeting device, and said display monitor having a plurality of receivers fixedly mounted to said monitor, said method comprising:
    emitting light signals from the transmitters connected to the targeting device;
    detecting light signals emitted from the transmitters at the receivers;
    calculating three-dimensional positions of the transmitters connected to the targeting device;
    calculating a vector of the targeting device from the positions of the transmitters; and
    displaying a line pointer that depicts the vector of the targeting device with respect to the display monitor, wherein the line pointer starts from a front surface of the monitor and projects into a three-dimensional scene displayed on said monitor.

10. A method of detecting the position and orientation of a targeting device relative to a display monitor, said targeting device having a plurality of transmitters or receivers connected to said targeting device, and said display monitor having a plurality of receivers or transmitters fixedly mounted thereto, said method comprising:
    emitting light signals from the transmitters;
    detecting the light signals emitted from the transmitters at the receivers;
    calculating the distance between the transmitters and the receivers using the light signals detected by the receivers;
    determining the three-dimensional position and orientation of the targeting device with respect to the display monitor using the distance between the transmitters and receivers; and
    wherein light signals are detected from three transmitters connected to the targeting device.

* * * * *

UNITED STATES PATENT AND TRADEMARK OFFICE
CERTIFICATE OF CORRECTION

PATENT NO. : 6,540,607 B2
DATED : April 1, 2003
INVENTOR(S) : Peter W. Mokris, Michael E. Albaugh and Minh Nguyen It is certified that error appears in the above-identified patent and that said Letters Patent is hereby corrected as shown below:

Column 8,
Line 4, "the comers of" should be -- the corners of --

Signed and Sealed this

Tenth Day of August, 2004

JON W. DUDAS
*Acting Director of the United States Patent and Trademark Office*